A. DAVISON.
SAW SETTING MACHINE.
APPLICATION FILED NOV. 20, 1919.
1,373,308.
Patented Mar. 29, 1921.
4 SHEETS—SHEET 1.
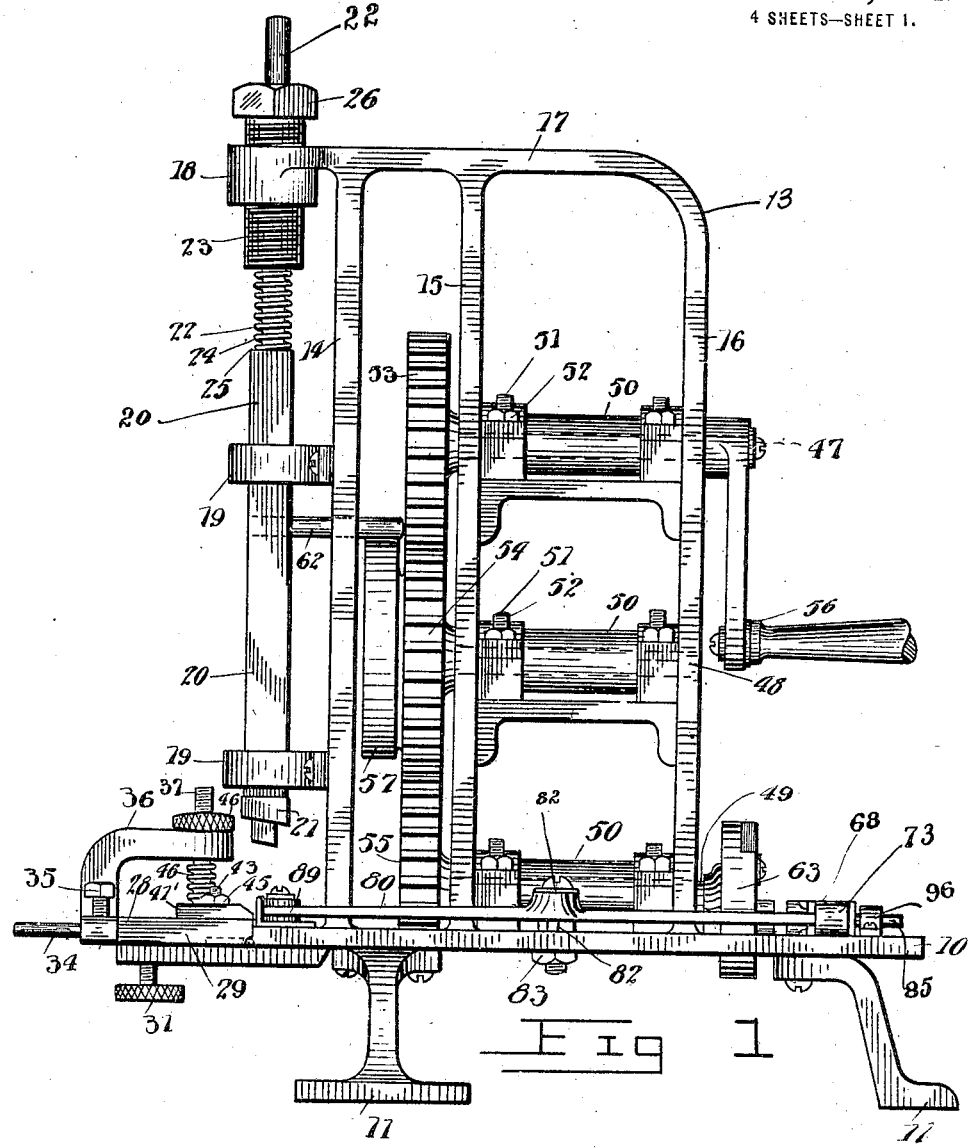
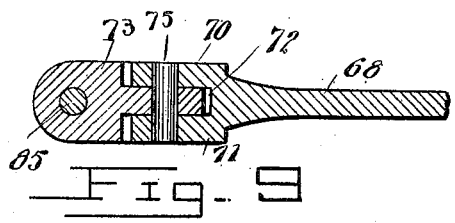
Inventor
Andrew Davison
By William Cahnton
Attorney

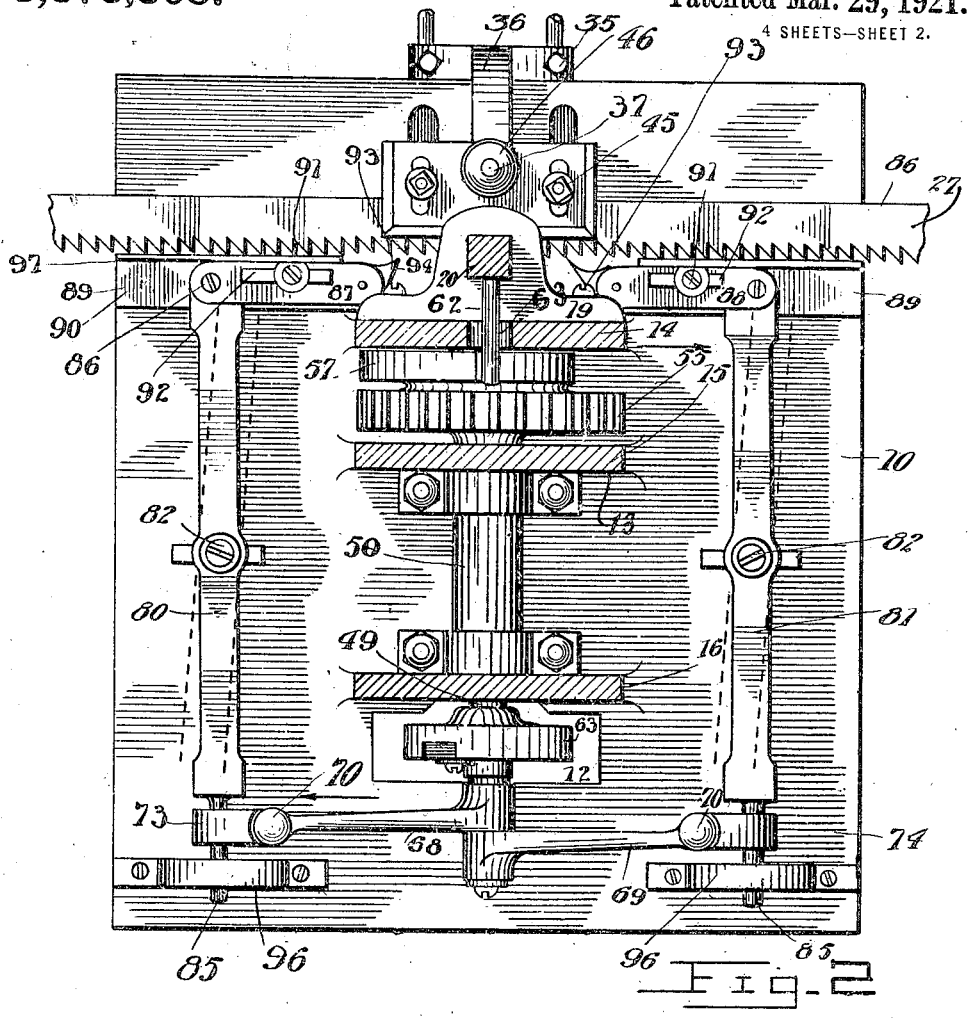
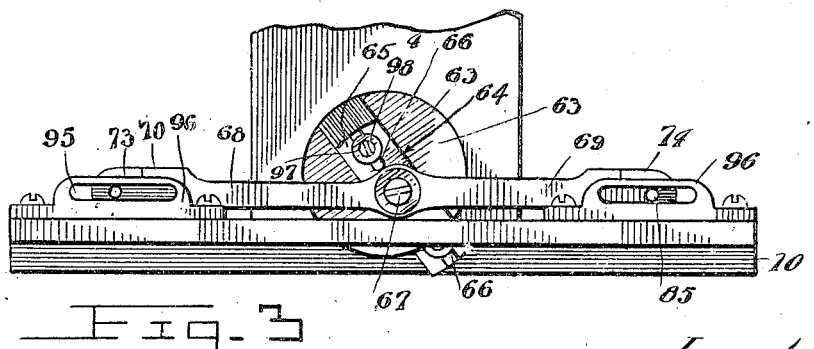

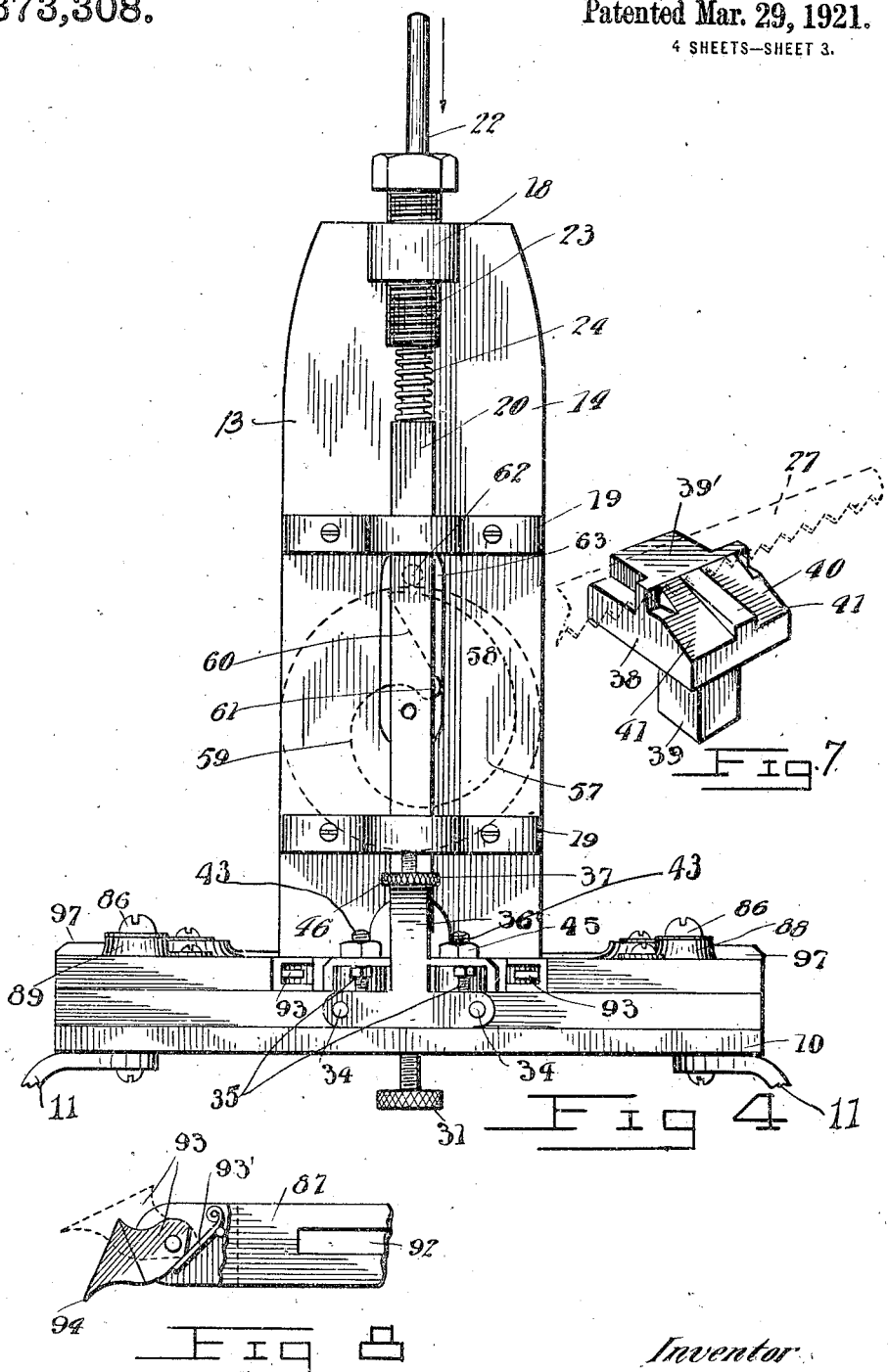

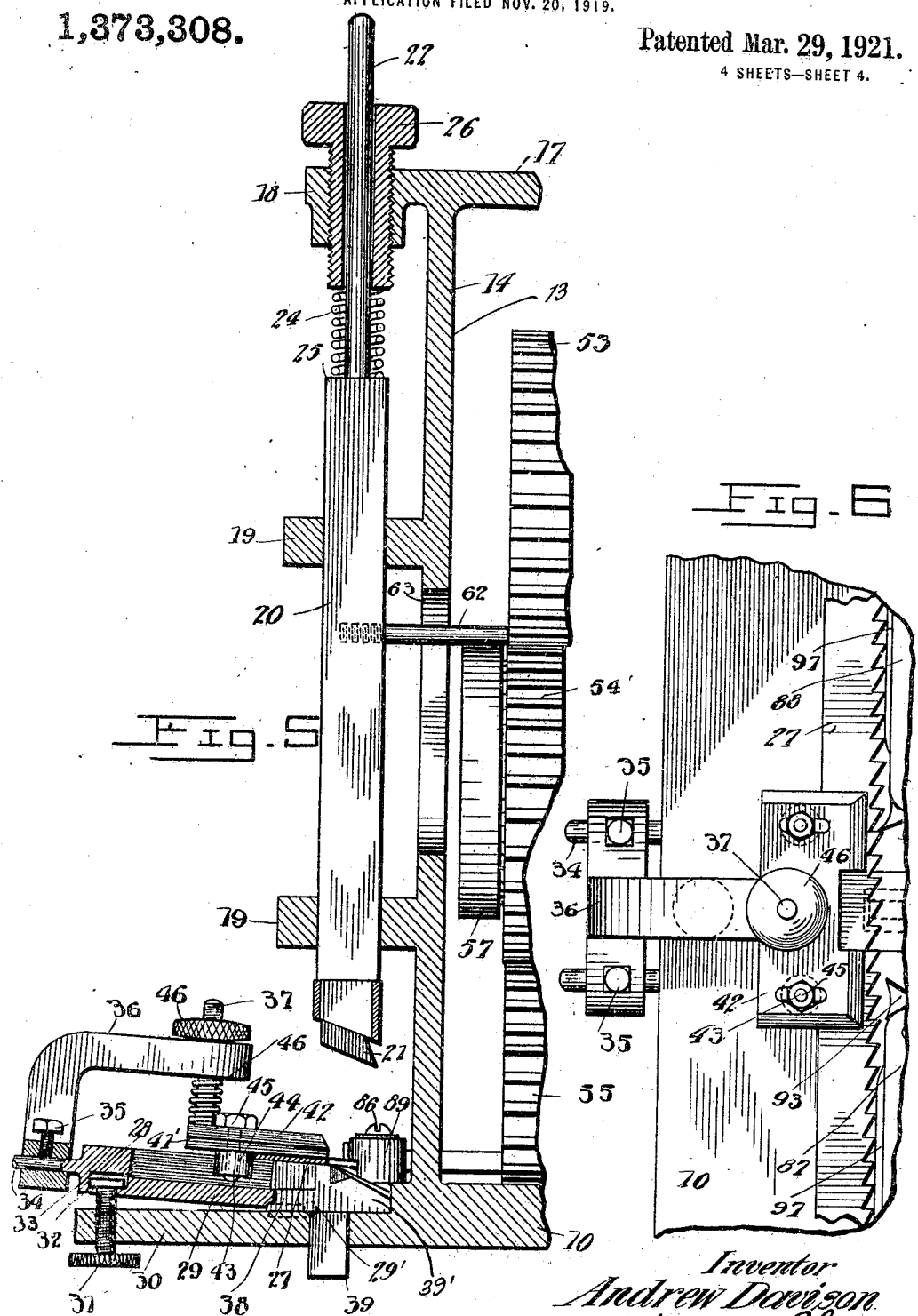

UNITED STATES PATENT OFFICE.

ANDREW DAVISON, OF VANCOUVER, BRITISH COLUMBIA, CANADA.

SAW-SETTING MACHINE.

1,373,308.　　　　　　Specification of Letters Patent.　　Patented Mar. 29, 1921.

Application filed November 20, 1919. Serial No. 339,352.

*To all whom it may concern:*

Be it known that I, ANDREW DAVISON, a subject of the King of Great Britain, residing at Vancouver, Province of British Columbia, Canada, have invented certain new and useful Improvements in Saw-Setting Machines; and I do hereby declare that the following is a full, clear, and exact description of the invention, such as will enable others skilled in the art to which it appertains to make and use the same.

The present invention relates to saw setting machines, and more particularly appertains to a device for setting the teeth of band saws, wherein the teeth are struck to properly set the same in staggered relation one with the other.

The principal object of the invention resides in the provision of means for automatically striking the alternate saw teeth, so that the same are evenly staggered.

A further object is to provide a device which may be operated by hand or foot power.

In former devices, the principal difficulty encountered was the inaccurate strike of the hammer, resulting in the improper adjustment of the saw teeth, whereas in the present device the saw is positioned on the bed of the machine in such position and consequently disposed at such angle with relation to the hammer, that an even blow or strike is imparted to each individual tooth and they are accordingly evenly staggered.

A still further object is to provide for the automatic feeding of the saw upon the lifting of the hammer, prior to the striking of the teeth.

A further object of the invention is to provide a device which is adapted to set saws of several types, obviating the use of separate machines for the different types and which is simple, economical of construction and easy of operation.

In the drawings forming a part of the specification:

Figure 1 is an end elevational view of the improved saw setting device mounted on suitable standards;

Fig. 2 is a plan elevation with portions of the uprights in cross section;

Fig. 3 is a partial rear end elevation of same;

Fig. 4 is a detail front end elevation;

Fig. 5 is a fragmental side elevation with portions in section, illustrating particularly the saw guiding device and the die housing and die;

Fig. 6 is a plan elevation of the saw guide and table;

Fig. 7 is a perspective view of the die, illustrating diagrammatically the position of the saw;

Fig. 8 is a fragmental plan elevation of the saw feeding mechanism; and

Fig. 9 is a vertical section of one of the feeding arm connections.

My improved saw setting device is adapted for band, circular and hand saws, and in this specification, the operation is set forth, which relates more particularly to the setting of the teeth of band saws, though minor changes may be resorted to, whereby hand saws may be set, and nothing in this specification will constitute a waiver to the use of the machines for setting the last mentioned type of saws.

In the drawings, the numeral 10 indicates the machine bed, which, in this instance, is supported upon the standards 11, which latter may be secured to a work table or pedestal.

The bed 10 is formed with a slot 12, through which extends an adjustable element which will hereinafter be more fully described.

Formed integral with the machine bed or suitably attached to the upper surface thereof, is the saw set frame 13, comprising the spaced uprights 14, 15 and 16, which latter are connected together at their upper ends and this connecting portion 17 is formed with an annular flange 18.

The upright 14 has secured to its outer edge a pair of blocks 19, and slidably mounted in said blocks 19 is the hammer rod 20, carrying on its lower end the detachable hammer 21. The upper end of said hammer rod 19 has connected thereto a cylindrical restricted shank 22, the upper end of which is slidably mounted in an exteriorly threaded bushing 23, mounted in the threaded opening of the annular flange 18. A spring 24 encircles shank 22 having its opposite ends engaging the off-set portion 25 of the hammer rod 20 and the lower end of said bushing 23. The upper end of the bushing 23 carries a cap nut 26, which, when adjusted, serves to in turn adjust the bushing 23 to compress or relax the spring 24 whereby the stroke or striking force of the hammer 21 is regulated.

For holding the band saw, which in this instance is designated by the numeral 27, in position beneath the hammer 21, I provide a saw guide table 28, which comprises the base portion 29 hingedly connected at 29' to offset extension 30 of the machine bed, and being vertically adjustable by means of the screw bolt 31, the upper square end 32 of which takes into the channel 33 of said guide table 28.

Table 28 is formed with rearwardly directed shank portions 34, to which is secured by means of bolts 35 a cross arm or bracket 36. Likewise table 28 is provided with a front opening. Bracket 36 is provided with an interiorly threaded opening in which is mounted the threaded bolt 37. A die block 38 fits into a square opening in table 28 and is formed on its base with a square shank 39, which seats into an opening provided therefor in the offset portion 30 of base 10 of the machine. The upper or striking surface of the die block 38 and comprising the die, across which the saw 27 is passed, is formed with a flat T-shaped portion 39' and the other half of the top surface of said die 38 is formed with a centrally disposed downwardly inclined flange 40. The surfaces 41 of the die disposed immediately at each side of flange 40 are directed downwardly at a greater angular degree than the degree of angulation of the said flange 40.

For centering the band saw 27 upon the die block 38, a plate 41' is provided, which is secured to the lower end of the threaded bolt 37. This plate 41' is formed with slotted extensions 42, and bolts 43 arranged in said slots carry rollers 44 upon their lower ends, while the upper ends of said bolts 43 carry adjusting nuts 45. A spring 46 is arranged on the bolt 37 between plate 41' and the lower surface of the bracket 36, and when the nut 46 is adjusted on bolt 37, the plate 41' is adjusted to or from the saw blade 27, which latter is positioned thereunder. In this position the lower face of said plate 41' will engage the upper surface of the band saw, as illustrated in Figs. 5 and 6 and hold the same upon the die block 38.

The saw when so positioned will have its straight edge portion engaging rollers 44 on plate 41', while the teeth will project over upon the central die part 40 and over the inclined surfaces 41.

The hammer rod 20 is actuated in the following manner: Shafts 47, 48 and 49 are mounted in housing tubes 50 of sectional form, the said sections being connected together by bolts and nuts 51 and 52. The opposite ends of said shafts 47, 48 and 49 have bearings in the uprights 15 and 16, and the inner ends of said shafts carry intermeshing gears 53, 54 and 55. Motion is imparted to these gears 53, 54 and 55 through a crank handle 56 on shaft 47. The shaft 48 carrying the central gear 54 has secured to the end extending through said gear, a segmental cam 57 formed with a lobe portion 58, the outer peripheral edge of the lobe portion of said cam corresponding with the curved edge portion 59 thereof.

The cam 57 is likewise formed with an inclined edge portion 60 which terminates in an arcuate slot 61.

The hammer rod 20 carries a cylindrical tripping rod 62, which passes through a longitudinal slot 63 in the frame upright 14. The tripping rod 62 rides on the peripheral edges of cam 57, and as the said cam revolves, the lobe part 58 elevates the tripping rod 62, causing the hammer rod 20 to be elevated against the tension of spring 24. When the peak of the cam has been passed, the tripping rod will be released from the cam edge and will thus fall downwardly. Thus the hammer rod 20 is released and the spring 24 will force the said rod 20 downwardly and the hammer 21 into engagement with one of the saw teeth.

Each alternate saw tooth is struck in this manner by the hammer 21, and due to the inclined central part 40 of the die plate, the teeth are struck outwardly in staggered relation one with the other. Likewise, the angular portions 41 of the die plate provides clearance for the teeth in their passage across the said die plate.

For automatically feeding the band saws to the die plate upon the elevation of the setting hammer, I provide a mechanism which will be described as follows:

Shaft 49 carrying gear 55 has its opposite end projecting from beyond the upright 16, and mounted on this shaft extension is a crank wheel 63, which revolves in the opening 12 of the bed plate 10.

Crank wheel 63 is formed on its outer face with a slot 64 in which is mounted an adjusting block 65 provided with longitudinal channels 66. A pin shaft 67 is secured at the central part of block 65 and loosely connected at their inner ends to said shaft 67 are the crank arms 68 and 69. The outer ends of said crank arms 68 and 69 are formed with vertically disposed enlargements which latter are bifurcated to form annular flanges 70 and 71 which are spaced by the bifurcation slots 72. Mounted in the slots 72 at the ends of crank arms 68 and 69 are the knuckle members 73 and 74 and pins 75 connect the said knuckle members 73 and 74 with the annular flanges 70 and 71 of the crank arms 68 and 69, thereby forming a universal connection therebetween.

Levers 80 and 81 are pivotally mounted at the central part on pins 82 mounted in the machine bed 10 and nuts 83 are disposed on the said pins 82 for holding the same in position on said bed. Levers 80 and 81 are formed with cylindrical reduced outer ends 85, while the forward ends of said levers have pivotal connection 86 with arms 87 and 88 slidably mounted in the guide plates 89 at the sides of the front upright 14. Plates 89 have secured in their base portion 90 the bolts 91 which extend upwardly through the elongated slots 92 formed in the arms 87 and 88. The inner ends of arms 87 and 88 have pivotally mounted therein, the pawl members 93, having spear points 94 adapted to engage the teeth of the saw and being capable of movement inwardly toward each other, being tensioned by blade springs 93'.

The reduced ends 85 of the levers 80 and 81 extend through horizontal slots 95 in blocks 96 and the oscillatory movement of the levers 80 and 81 on their pivotal connections 82 is thus limited.

The vertical portion 97 of guide plates 89 serves to guide the toothed portion of the saw in its travel across the machine bed 10.

For regulating the throw of the crank arms 68 and 69 and consequently the feeding of the saw to the hammer 21, the block 65 may be adjusted in channel 66 of crank wheel 63, so that pin shaft 67 is disposed below the axial center of shaft 49 carrying the said pulley.

Screws 98 pass through the channels 66 of block 65, and when adjusted serve to hold the said block in position.

By adjusting block 65 outwardly from the axial point of the crank wheel 63, the shaft 67 may be adjusted to regulate the throw of crank arms 68 and 69.

In operation, the pawl members 93 are actuated by the above recited mechanism upon the elevation of the hammer rod 20, or that is to say after the hammer 21 has struck a tooth of the saw 27 upon the die plate 38. Each alternate tooth of the saw is stamped or struck by the hammer 21 and disposed in staggered relation to each other and the degree of striking pressure or blow is, as before stated, regulated by adjusting the bushing 23.

In this manner the saw is guided across the bed plate of the machine and intermittently moved over the die plate.

Having thus fully described my invention, what I claim as new and desire to secure by Letters Patent is:

1. A saw set machine comprising a table and uprights, shafts journaled in said uprights, a hammer rod supported upon one of said uprights, a hammer connected to said hammer rod, an adjustable resilient element connected to said hammer rod, gears mounted on said shafts, a pin carried by said hammer rod, a cam arranged on one of said shafts for operating said hammer rod, a saw feed mechanism, operative connections between one of said shafts and said saw feed mechanism, means for actuating the hammer rod and means for operating the feeding mechanism simultaneously with the hammer rod.

2. A saw feed machine comprising a bed, an upright frame mounted on said bed, a hammer rod supported on said frame, shafts journaled in said frame, gears carried by said shafts and adapted for intermeshing engagement with each other, a cam arranged on one of said shafts, a crank handle arranged on another of said shafts, a pin mounted on said hammer rod and adapted for intermittent engagement with said cam for elevating said hammer, a crank wheel mounted on the lower of said shafts, a pin shaft arranged on said crank wheel, crank arms connected to said pin shaft, levers pivotally mounted on said bed, said arms being flexibly connected to said levers, arms connected to said levers, pawls pivotally mounted on the last mentioned arms, said pawls adapted for engagement with the saw for feeding the same to the hammer, a saw guide table, means for adjusting said table, and means for simultaneously operating the hammer rod and saw feeding mechanism.

3. A saw feed machine comprising a bed, an upright frame mounted on said bed, a hammer rod supported on said frame, shafts journaled in said frame, gears carried by said shafts and adapted for intermeshing engagement with each other, a cam arranged on one of said shafts, a crank handle arranged on another of said shafts, a pin mounted on said hammer rod and adapted for intermittent engagement with said cam for elevating said hammer, a crank wheel mounted on the lower of said shafts, a pin shaft arranged on said crank wheel, crank arms connected to said pin shaft, levers pivotally mounted on said bed, said arms being flexibly connected to said levers, arms connected to said levers, pawls pivotally mounted on the last mentioned arms, said pawls adapted for engagement with the saw for feeding the same to the hammer, a saw guide table, means for adjusting said table, means for simultaneously operating the hammer rod and saw feeding mechanism, and means for regulating the feed of the saw.

In witness whereof I have hereunto set my hand.

ANDREW DAVISON.